US010360286B2

(12) United States Patent
Sheldon et al.

(10) Patent No.: US 10,360,286 B2
(45) Date of Patent: Jul. 23, 2019

(54) COLOR CODING OF LAYOUT STRUCTURE ELEMENTS IN A FLOW FORMAT DOCUMENT

(75) Inventors: Elizabeth Jeanne Sheldon, Woodinville, WA (US); Milos Lazarevic, Belgrade (RS); Dragan Slaveski, Belgrade (RS); Marija Antic, Belgrade (RS); Aleksandar Tomic, Belgrade (RS)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 13/807,873

(22) PCT Filed: Jul. 20, 2012

(86) PCT No.: PCT/EP2012/003085

§ 371 (c)(1),
(2), (4) Date: Aug. 20, 2013

(87) PCT Pub. No.: WO2014/012565

PCT Pub. Date: Jan. 23, 2014

(65) Prior Publication Data

US 2015/0121201 A1 Apr. 30, 2015

(51) Int. Cl.
*G06F 17/20* (2006.01)
*G06F 17/21* (2006.01)
(Continued)

(52) U.S. Cl.
CPC ....... *G06F 17/212* (2013.01); *G06K 9/00469* (2013.01); *G06T 11/001* (2013.01)

(58) Field of Classification Search
None
See application file for complete search history.

(56) References Cited

U.S. PATENT DOCUMENTS 6,032,163 A * 2/2000 Tou .................... G06F 17/218 715/235
6,732,090 B2 5/2004 Shanahan et al.
(Continued)

FOREIGN PATENT DOCUMENTS

CN 101271463 A 9/2008

OTHER PUBLICATIONS

Content Organization, *Research-Based Web Design & Usability Guidelines*, Chapter 16, http://www.usability.gov/pdfs/chapter16.pdf, pp. 169-178 (Retrieved Mar. 13, 2012).
(Continued)

*Primary Examiner* — Keith D Bloomquist
(74) *Attorney, Agent, or Firm* — Merchant & Gould P.C.

(57) ABSTRACT

A color coding engine and a comparison engine are provided. A color coding engine may be utilized to detect logical layout object attributes in a flow format document and apply a unique color to textual elements associated with each logical layout object attribute. The resulting color coded document may be saved as a target flow format document. The target flow format document may be converted to a fixed format document and then converted by a conversion engine to a flow format document. The resulting converted flow format document may be saved as an output flow format document. A comparison engine may be utilized to compare the output flow format document and the target flow format document to determine if layout information has been properly preserved in the document conversion process.

18 Claims, 11 Drawing Sheets

(51) Int. Cl.
*G06K 9/00* (2006.01)
*G06T 11/00* (2006.01)

(56) References Cited

U.S. PATENT DOCUMENTS

| | | | | |
|---|---|---|---|---|
| 7,178,099 | B2 | 2/2007 | Meyer et al. | |
| 7,627,590 | B2 | 12/2009 | Boguraev et al. | |
| 7,966,765 | B2 | 8/2011 | Mitnick et al. | |
| 2002/0078100 | A1* | 6/2002 | Tewari | G06F 17/2264 715/234 |
| 2003/0014445 | A1* | 1/2003 | Formanek | G06F 17/211 715/247 |
| 2004/0037470 | A1* | 2/2004 | Simske | G06F 17/273 382/229 |
| 2004/0268254 | A1* | 12/2004 | Fujiwara | G06F 17/30011 715/255 |
| 2008/0091656 | A1 | 4/2008 | Charnock et al. | |
| 2008/0152306 | A1 | 6/2008 | Kang et al. | |
| 2008/0162603 | A1* | 7/2008 | Garg | G06F 17/218 |
| 2013/0174011 | A1* | 7/2013 | Le Chevalier | G06F 17/22 715/234 |

OTHER PUBLICATIONS

Costa e Silva, A. et al., "Design of an end-to-end method to extract information from tables," *International Journal of Document Analysis and Recognition*, vol. 8, No. 2, pp. 144-171 (2006).

Hirano, T. et al., "Text and Layout Information Extraction from Document Files of Various Formats Based on the Analysis of Page Description Language," *Ninth International Conference on Document Analysis and Recognition* (*ICDAR 2007*), 5 pages (2007).

Hu, J. et al., "Table Structure Recognition and Its Evaluation," *Proceedings of SPIE*, vol. 4307, 12 pages (2000).

International Search Report and Written Opinion for PCT/EP2012/003085 dated Apr. 17, 2013.

Kieninger, T., "Table Structure Recognition Based on Robust Block Segmentation," *Proceedings of SPIE*, vol. 3305, 11 pages (1998).

Chinese First Office Action in 201280074809.8 dated Mar. 2, 2017 with English Translation. 14 pages.

"Office Action Issued in European Patent Application No. 12740313.7", dated Feb. 27, 2018, 5 Pages.

"Third Office Action Issued in Chinese Patent Application No. 201280074809.8", dated Apr. 4, 2018, 5 Pages.

Chinese Second Office Action in 201280074809.8 dated Dec. 5, 2017 with English Translation, 16 pages.

* cited by examiner

REPORT 314

| TABLE DETECTION AND TABLE BORDERS | | | | |
|---|---|---|---|---|
| CATEGORY | CORRECT | COLOR CODED | PRECISION | RECALL |
| TABLE DETECTION | 110072 | 130728 | 84.20% | 90.22% |
| TABLE CELL DETECTION | 274201 | 276845 | 99.04% | 96.02% |
| TABLE BORDER DETECTION | 113906 | 124508 | 91.24% | 93.06% |

COLOR CODING OF LAYOUT STRUCTURE ELEMENTS IN A FLOW FORMAT DOCUMENT

BACKGROUND

Flow format documents and fixed format documents are widely used and have different purposes. Flow format documents organize a document using complex logical formatting objects such as sections, paragraphs, columns, and tables. As a result, flow format documents offer flexibility and easy modification making them suitable for tasks involving documents that are frequently updated or subject to significant editing. In contrast, fixed format documents organize a document using basic physical layout elements such as text runs, paths, and images to preserve the appearance of the original. Fixed format documents offer consistent and precise format layout making them suitable for tasks involving documents that are not frequently or extensively changed or where uniformity is desired. Examples of such tasks include document archival, high-quality reproduction, and source files for commercial publishing and printing. Fixed format documents are often created from flow format source documents. Fixed format documents also include digital reproductions (e.g., scans and photos) of physical (i.e., paper) documents.

In situations where editing of a fixed format document is desired but the flow format source document is not available, the fixed format document must be converted into a flow format document. Conversion involves parsing the fixed format document and transforming the basic physical layout elements from the fixed format document into the more complex logical elements used in a flow format document.

When testing a conversion process for accuracy, output after a fixed format document conversion to a flow format document may be tested to determine if layout information is extracted properly from the fixed format document. Fixed format documents have limited facilities for preserving document layout information. Currently, testing of some layout features may require a manual visual inspection of the layout features. For example, a tester may look at a document before conversion to a flow format document and the document after conversion to see if a feature, such as a paragraph, is the same and thus, converted correctly. As can be appreciated, a manual visual inspection can be inefficient and prone to human error. For example, a tester may look at a header in a converted document and may determine that it looks like it is in the correct position at the top of a page; however, the header may not be in a heading region in the document.

It is with respect to these and other considerations that the present invention has been made.

SUMMARY

Embodiments of the present invention solve the above and other problems by utilizing color to embed information about layout structure features and attributes of a document into content of the document.

Color coding may be utilized to distinguish between different layout structure elements in a document. A color coding engine may be utilized to detect logical layout object attributes in a flow format document and apply a unique color to textual elements associated with each logical layout object attribute. The resulting color coded document may be saved as a target flow format document and converted to a fixed format document. The fixed format document may be converted by a conversion engine to a flow format document and saved as an output flow format document. A comparison engine may be utilized to compare the output flow format document and the target flow format document to determine if layout information has been properly preserved in the document conversion process.

The details of one or more embodiments are set forth in the accompanying drawings and description below. Other features and advantages will be apparent from a reading of the following detailed description and a review of the associated drawings. It is to be understood that the following detailed description is explanatory only and is not restrictive of the invention as claimed.

This summary is provided to introduce a selection of concepts in a simplified form that are further described below in the detailed description. This summary is not intended to identify key features or essential features of the claimed subject matter, nor is it intended as an aid in determining the scope of the claimed subject matter.

BRIEF DESCRIPTION OF THE DRAWINGS

The accompanying drawings, which are incorporated in and constitute a part of this disclosure, illustrate various embodiments of the present invention. In the drawings:

FIG. 6 is an illustration of an example report;

DETAILED DESCRIPTION

Figure 1:
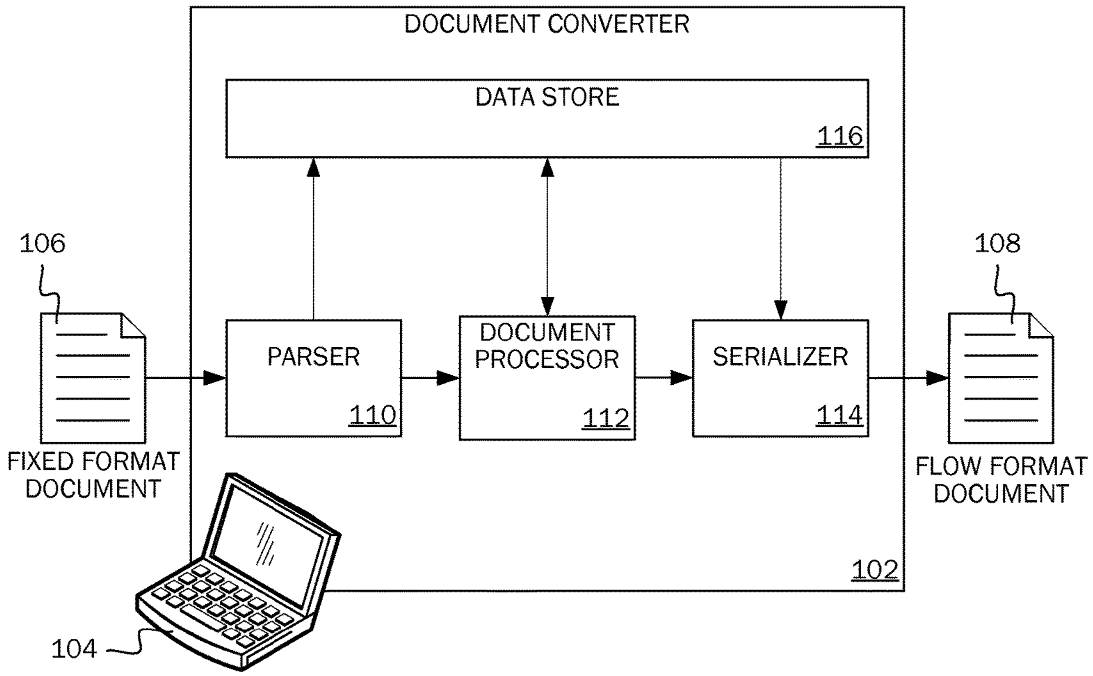
FIG. 1 is a block diagram of one embodiment of a system including a document converter.

As briefly described above, embodiments of the present invention are directed to providing color coding of layout structure elements in a flow format document. The flow format document may be converted into a fixed format document and subsequently back into a flow format document. According to embodiments, the color coding may be utilized to distinguish between layout structure elements that may be compared in a comparison test.

The following detailed description refers to the accompanying drawings. Wherever possible, the same reference numbers are used in the drawing and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention, but instead, the proper scope of the invention is defined by the appended claims.

Referring now to the drawings, in which like numerals represent like elements, various embodiments will be described. FIG. 1 illustrates one embodiment of a system incorporating a document converter 102 executed on a computing device 104. The document converter 102 converts a fixed format document 106 into a flow format document 108 using a parser 110, a document processor 112, and a serializer 114. The parser 110 reads and extracts data from the fixed format document 106. The data extracted from the fixed format document is written to a data store 116 accessible by the document processor 112 and the serializer 114. The document processor 112 analyzes and transforms the data into flowable elements using one or more detection and/or reconstruction engines. Finally, the serializer 114 writes the flowable elements into a flowable document format (e.g., a word processing format).

Figure 2:
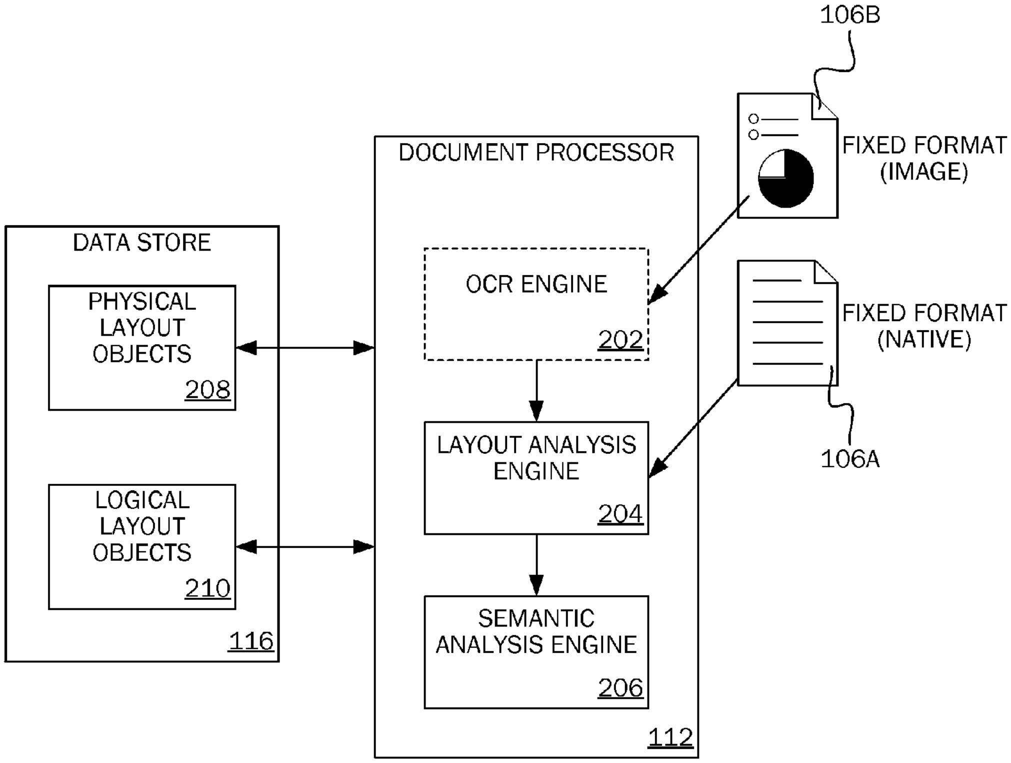
FIG. 2 is a block diagram showing an operational flow of one embodiment of the document processor.

FIG. 2 illustrates one embodiment of the operational flow of the document processor 112 in greater detail. The document processor 112 includes an optional optical character recognition (OCR) engine 202, a layout analysis engine 204, and a semantic analysis engine 206. The data contained in the data store 116 includes physical layout objects 208 and logical layout objects 210. In some embodiments, the physical layout objects 208 and logical layout objects 210 are hierarchically arranged in a tree-like array of groups (i.e., data objects). In various embodiments, a page is the top level group for the physical layout objects 208, while a section is the top level group for the logical layout objects 210. The data extracted from the fixed format document 106 is generally stored as physical layout objects 208 organized by the containing page in the fixed format document 106. The basic physical layout objects 208 include text-runs, images, and paths. Text-runs are the text elements in page content streams specifying the positions where characters are drawn when displaying the fixed format document. Images are the raster images (i.e., pictures) stored in the fixed format document 106. Paths describe elements such as lines, curves (e.g., cubic Bezier curves), and text outlines used to construct vector graphics. Logical layout objects 210 include flowable elements such as sections, paragraphs, columns, tables, and lists.

Where processing begins depends on the type of fixed format document 106 being parsed. A native fixed format document 106A created directly from a flow format source document contains some or all of the basic physical layout elements. The embedded data objects are extracted by the parser and are available for immediate use by the document converter; although, in some instances, minor reformatting or other minor processing is applied to organize or standardize the data. In contrast, all information in an image-based fixed format document 106B created by digitally imaging a physical document (e.g., scanning or photographing) is stored as a series of page images with no additional data (i.e., no text-runs or paths). In this case, the optional optical character recognition engine 202 analyzes each page image and creates corresponding physical layout objects. Once the physical layout objects 208 are available, the layout analysis engine 204 analyzes the layout of the fixed format document. After layout analysis is complete, the semantic analysis engine 206 enriches the logical layout objects with semantic information obtained from analysis of the physical layout objects and/or logical layout objects.

Figure 3:
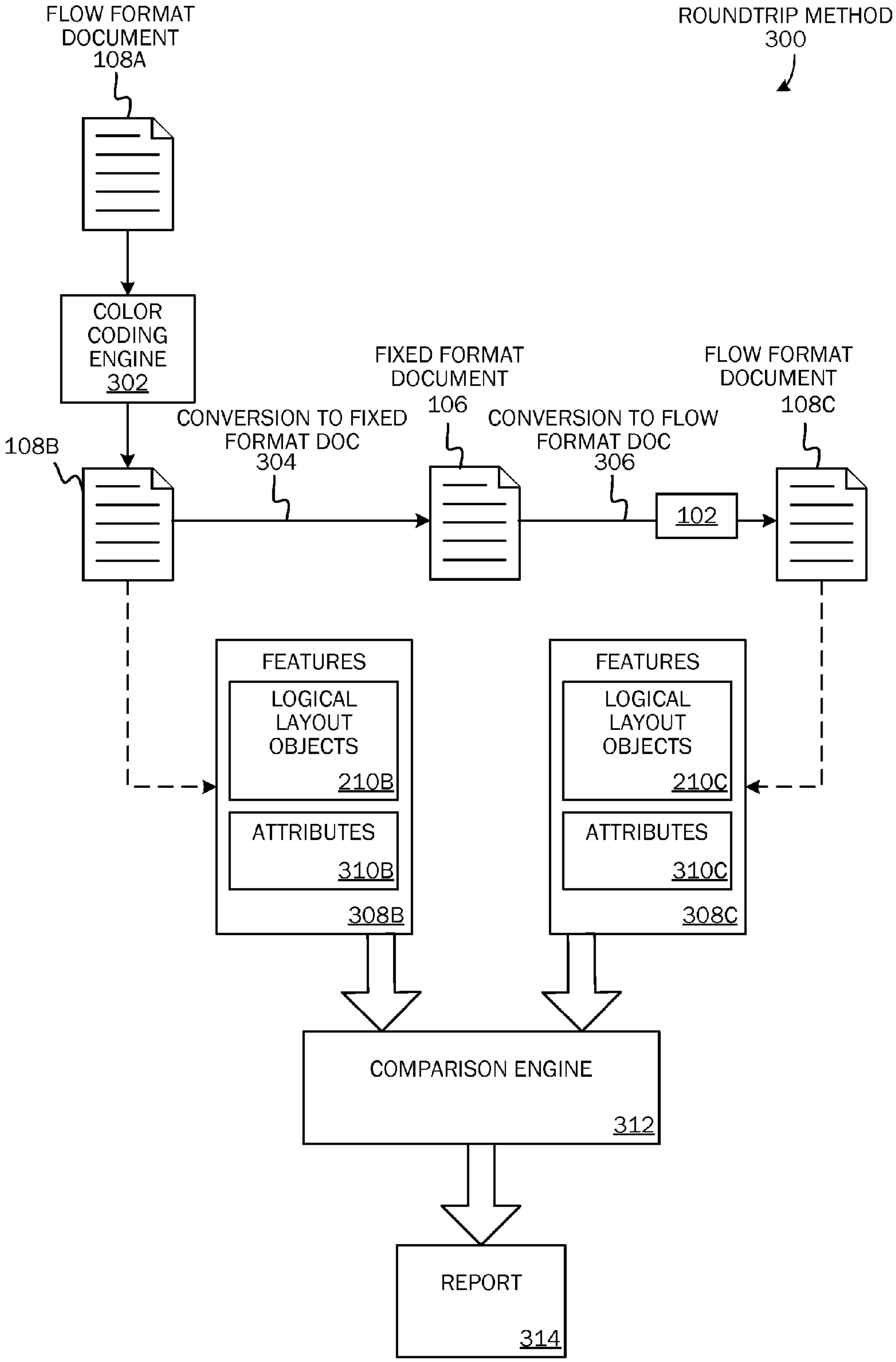
FIG. 3 is a block diagram showing one embodiment of a roundtrip method including a color coding engine and a comparison engine.

Conversion of a fixed format document 106 to a flow format document 108C may be tested for accuracy. According to embodiments, one testing method may include a roundtrip method. Referring now to FIG. 3, a roundtrip method 300 for determining if logical layout objects 210 have been extracted properly from a fixed format document 106 is illustrated. As shown, a flow format document 108A (e.g., a word processing document) may be converted 304 into a fixed format document 106 (e.g., a PDF document). The fixed format document 106 may be a tagged or non-tagged fixed format document. The fixed format document 106 may then be converted 306 back into a flow format document 108C. Conversion 306 from a fixed format document 106 to a flow format document 108C may be executed by a converter 102 as described above with respect to FIG. 1.

According to embodiments, when converting 304 a flow format document 108A to a fixed format document 106, one or more types of logical layout objects 210 may be coded in color. According to one embodiment, coding logical layout objects 210 may be performed by a color coding engine 302. By coding logical layout objects 210 in color, many absolute numbers that describe various document properties may be preserved as color may be converted from different formats with little to no degradation. Logical layout objects 210 that may be color-coded may include, but are not limited to, paragraphs, sections, tables, lists, and font properties. The term "target document" 108B may herein be used to describe a flow format document 108B before it is converted 304 to a fixed format document 106 and the term "output document" 108C may herein be used to describe a flow format document 108C after it is converted 306 from a fixed format document 106.

Figure 4:
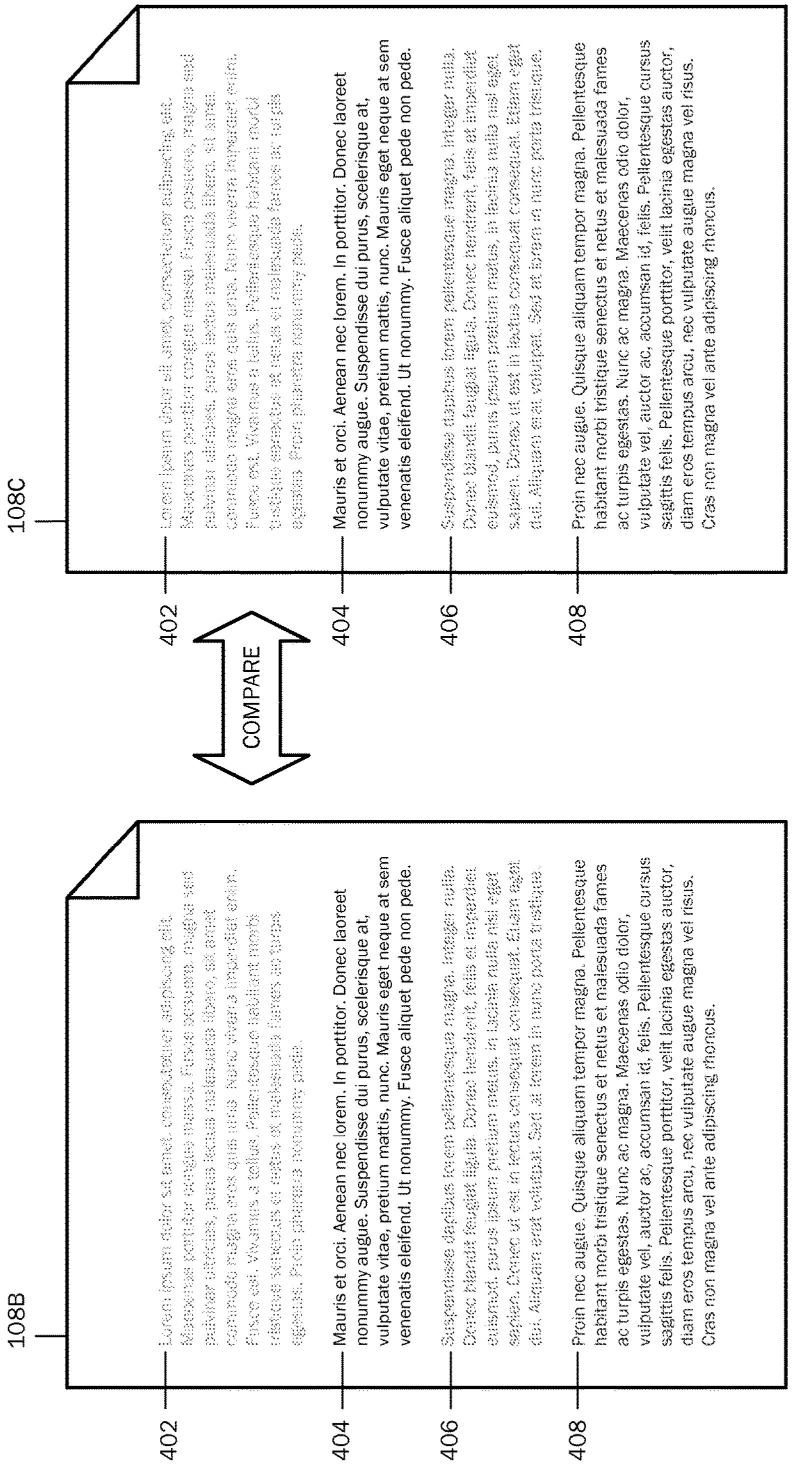
FIG. 4 is an illustration of a comparison of color coded logical layout objects in an example target document and an output document.

According to embodiments, color coding may be utilized to distinguish between different logical layout objects 210 that may be compared in a comparison test. Each logical layout object 210 of a selected type of logical layout objects (e.g., each list item in a list, each paragraph in a document, etc.) may be colored with a unique color. For example and as illustrated in FIG. 4, color coding may be utilized to store information about a paragraph. As illustrated in FIG. 4, each paragraph 402,404,406,408 in a flow format document 108A may be colored with a different color. For example, a first paragraph 402 may be colored red, a second paragraph 404 may be colored blue, a third paragraph 406 may be colored green, and a fourth paragraph 408 may be colored purple. In this example, the color coding may be utilized to provide an easily identifiable comparison feature to compare paragraphs 402,404,406,408 in a target document 108B and an output document 108C.

Figure 5:
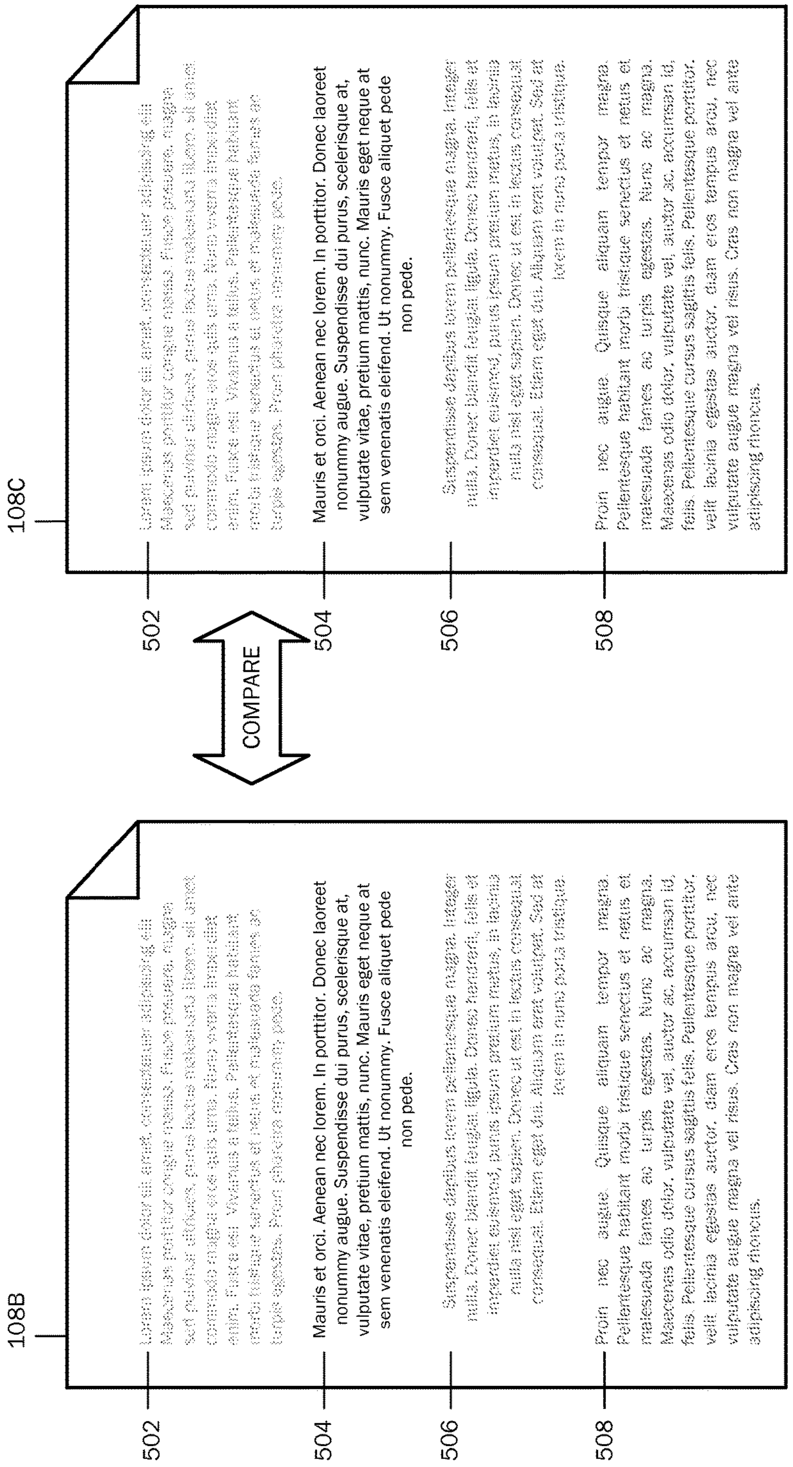
FIG. 5 is an illustration of a comparison of color coded logical layout object attributes in an example target document and an output document.

Additionally, color coding may be utilized to represent information about a logical layout object's 210 attributes 310. For example and as illustrated in FIG. 5, color coding may be utilized to distinguish between paragraph alignments (an attribute 310). Each paragraph alignment type (e.g., left, center, right, and justified) may be coded with a different color. For example, text in a first paragraph 502 may be aligned to the left and color coded green, text in a second paragraph 504 may be aligned in the center and color coded brown, text in a third paragraph 506 may be aligned to the right and color coded orange, and text in a fourth paragraph 508 may be justified and color coded gray. In this example, the color coding may be utilized to provide an easily identifiable comparison feature to compare alignments of paragraphs 502,504,506,508 in a target document 108B and an output document 108C.

Referring back to FIG. 2, according to embodiments, one or more features 308 may be selected to be compared in a comparison test. The comparison test may include testing a subset of documents 108B,108C. The comparison test may be performed by a comparison engine 312. The comparison engine 312 may focus on the selected features 308 when comparing an output document 108C with a target document 108B. The features 308 that may be compared may include logical layout objects 210 (described above with respect to FIG. 4) and may include attributes 310 of the logical layout objects 210 (as described above with respect to FIG. 5). Logical layout objects 210 that may be color-coded and compared may include, but are not limited to, sections, paragraphs, lists, tables, and words. The table below shows some logical layout objects 210 and associated attributes 310 that may be color-coded and compared according to embodiments. As should be appreciated, the table is not an exhaustive list of logical layout objects 210 and attributes 310 and embodiments should not be limited to the objects and attributes included in the table.

TABLE 1

| | |
|---|---|
| sections | margins |
| | contained paragraphs |
| | reading order of contained paragraphs |
| | number of columns |
| | width of columns |
| | header style |
| | footer style |
| paragraphs | contained words |
| | reading order of paragraphs |
| | line spacing |
| | orientation |
| | indentation |
| | alignment |
| | before paragraph spacing |
| | after paragraph spacing |
| | paragraph borders |
| | text run borders |
| bulleted lists | bullet type |
| | indentation |
| | level |
| | number of items |
| numbered lists | numbering type |
| | indentation |
| | level |
| | starting number |
| | number of items |
| list items | words contained |
| tables | border style |
| | number of columns |
| | width of columns |
| | number of rows |
| | height of rows |
| table cells | cell padding |
| | cell spacing |
| | cell contents (paragraphs/images) |
| | alignment |
| images | formatting |
| words | font family |
| | size |
| | typeset |
| | font style (bold, italics, underline) |
| | superscript |
| | subscript |
| | strikethrough |
| | double strikethrough |
| | text highlight |
| | text shading |
| hyperlinks | hyperlink |
| table of contents | contained paragraphs |
| | tab leaders |

For example, paragraph detection may be tested to determine if paragraphs from a fixed format document 106 are correctly reconstructed in an output document 108C. That is, a determination may be made if the paragraphs have the same content and are in the same reading order. According to an embodiment, the paragraphs may be color coded to preserve such information as which words belong to a same paragraph (e.g., all the words in a paragraph may have the same color) and the reading order of each paragraph (e.g., the color with which paragraphs are colored may have a determined sequence). Accuracy may be calculated by iterating through the paragraphs in an output document 108C and determining the number of colors appearing in each paragraph as well as the number of paragraphs in which every color appears. For example, a number or percentage of detected paragraphs may be detected. If the color of a paragraph in the target document 108B appears in only one paragraph of the output document 108C and the paragraph of the output document 108C is of unique color, the target paragraph (i.e., paragraph in the target document 108B) may be considered detected. Additionally, a number or percentage of detected paragraphs with fully reconstructed content may be determined, for example, if all the words of a detected paragraph are the same in both the target document 108B and the output document 108C. A number or percentage of detected paragraphs in a correct reading order may be detected. For example, if a detected paragraph comes after another detected paragraph, their colors may be checked. If the colors are in sequential order, the paragraphs may be considered to be in correct reading order. Additionally, a number or percentage of paragraphs that are merged, split, or both split and merged in the output document 108C may be determined.

According to embodiments, after a comparison test of the selected features 308 in a target document 108C and a target document 108B is performed by the comparison engine 312, an accuracy level may be determined. The accuracy level may be provided in a report 314 and may include a precision metric. According to an embodiment, precision may be defined as:

$$\text{Precision} = \frac{\text{Number of True Positives}}{\text{Number of True Positives} + \text{Number of False Positives}}$$

The accuracy level may include a recall metric. According to an embodiment, recall may be defined as:

$$\text{Recall} = \frac{\text{Number of True Positives}}{\text{Number of True Positives} + \text{Number of False Negatives}}$$

The accuracy level may include a relative error metric. According to an embodiment, relative error may be used as a metric for continuous values, for example, for features whose values are continuous (e.g., margins). Relative error may be defined as:

$$\text{Relative Error} = \frac{\text{Desired Result} - \text{Result}}{\text{Desired Result}}$$

An example of a report 314 is illustrated in FIG. 6. As illustrated in FIG. 6, a report 314 may include the features 308 being compared in the comparison test and may include metrics such as a precision metric 602 and a recall metric 604. The metrics 602,604 may be calculated by comparison of the correct output (target document 108B) with the actual output (flow format document 108C after conversion 306 back into a flow format document 108C).

According to embodiments, color coding may be used for training data. For example, with machine learning, a training set may be provided wherein the training set may include features 308 and expected results that should be deducted from those features. Embodiments may be used to generate the training data. The training data may be utilized to further develop the converter 102.

Figure 7:
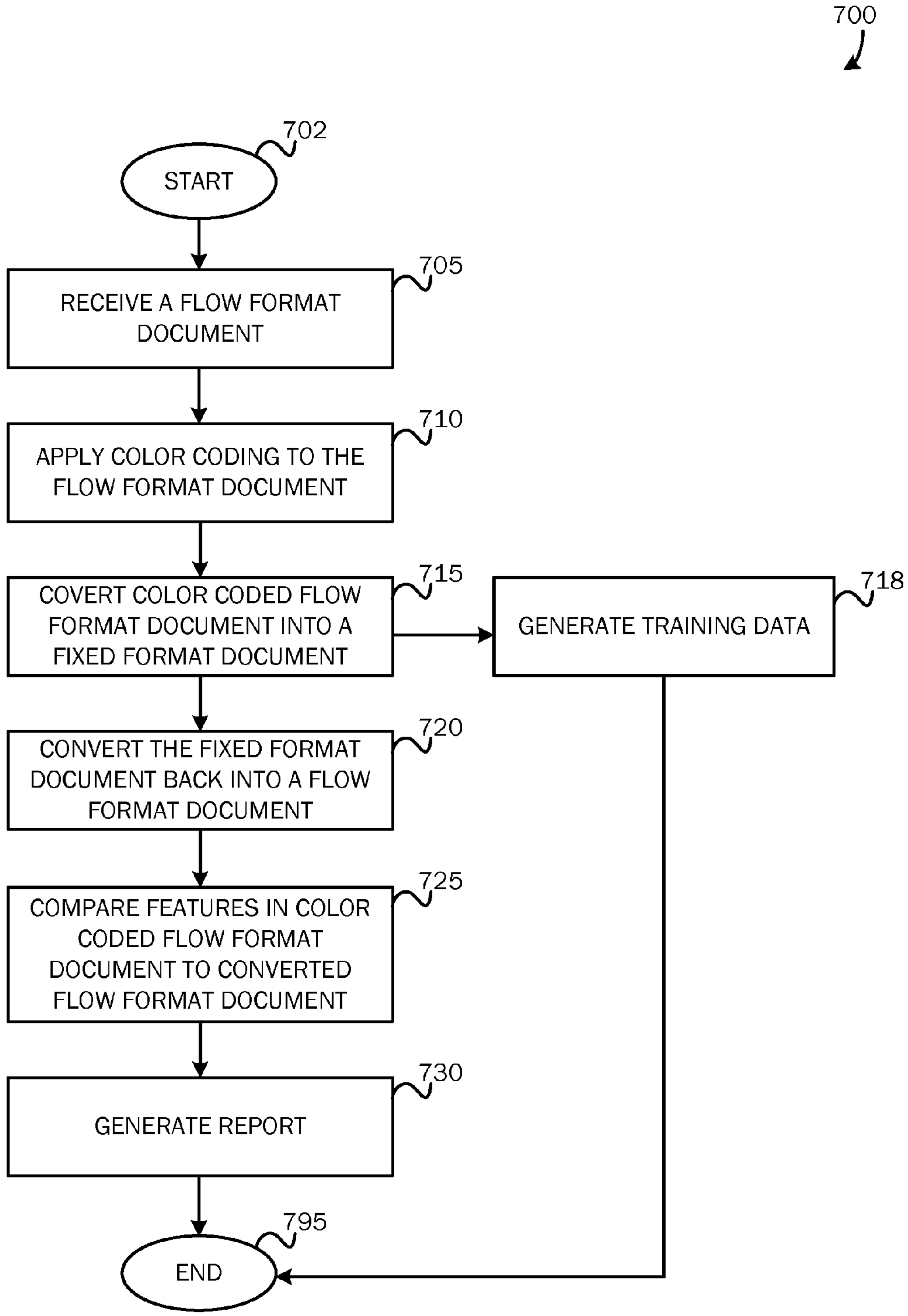
FIG. 7 is a flow chart of a method for utilizing color coding to detect layout information in a flow format document converted from a fixed format document.

FIG. 7 is a flow chart of a method 700 for providing color coding according to an embodiment. The method 700 starts at OPERATION 702 and proceeds to OPERATION 705 where a flow format document 108A is received. According to embodiments, the flow format document 108A may include complex logical formatting objects such as sections, paragraphs, columns, and tables that provide a flow and layout to the document. For example, a flow format document 108A may include a word processing document comprising formatting (e.g., font style, table, headers, footers, numbered lists, bulleted items, margins, etc.).

At OPERATION 710, the flow format document 108A may be color coded. According to embodiments, flow format document 108A layout information may be coded in color and applied to the document 108A. The coded layout information may include structure elements such as features 308 selected to be tested. As described above, features 308 may include logical layout objects 210 and attributes 310. A unique color may be applied to textual elements associated with each of the attributes 310 of logical layout objects 210 selected to be tested.

For example, paragraphs in a word processing document may be color coded, each paragraph coded with a different color. As another example, list items may be color coded. The color coding may be utilized to encode attributes 310 such as bullet/number type, level, and identification. According to embodiments, depending on the logical layout objects 210 and attributes 310 selected to be tested, a variable number of documents 108A may be color coded since the features 308 may interact/interfere with each other. For example, if paragraph alignment and identification of paragraphs are features 308 to be tested, two sets of documents 108A may need to be coded. Left justified paragraphs may be color coded blue. Two sequential paragraphs may be left justified and thus color coded blue, which may interfere with determining if the two paragraphs are separate paragraphs.

According to embodiments, different logical layout objects 210 and attributes 310 may be color-coded in a same document 108 by dividing a color space into groups. For example, if a color in RGB is represented using three bytes, the first byte may be used for color coding a first attribute 310 (e.g., paragraph alignment), and the remaining bytes may be used for color coding a second attribute 310 (e.g., paragraph identification). According to embodiments, the color coded flow format document 108B may be saved as a target document 108B and loaded to a data store.

At OPERATION 715, the color coded flow format document (target document) 108B may be converted 304 to a fixed format document 106. At OPERATION 720, the fixed format document 106 may be converted 306 back into a flow format document 108C. According to embodiments, the conversion 306 from a fixed format document 106 to a flow format document 108C may be performed by the document converter 102. At OPERATION 718, training data may be generated. The training data may be utilized for further development of the converter 102 (e.g., machine learning).

At OPERATION 725, features 308B in the flow format document 108B prior to being converted into a fixed format document 106 (i.e. correct output) may be compared with features 308C in the flow format document 108C after being converted into the fixed format document 106 (i.e., output document 108C). According to embodiments, the comparison may be performed by a comparison engine 312. The comparison may be performed to determine if the document converter 102 has properly extracted layout information from the fixed format document 106 when converting the fixed format document 106 to a flow format document 108C. The comparison engine 312 may be operable to perform the comparison, calculate metrics, and generate a report 314.

At OPERATION 730 a report 314 may be generated. As described above, the report 314 may provide metrics for determining accuracy of the conversion 306 of a fixed format document 106 to a flow format document 108C. The method 700 ends at OPERATION 795.

While the invention has been described in the general context of program modules that execute in conjunction with an application program that runs on an operating system on a computer, those skilled in the art will recognize that the invention may also be implemented in combination with other program modules. Generally, program modules include routines, programs, components, data structures, and other types of structures that perform particular tasks or implement particular abstract data types.

Figure 8:
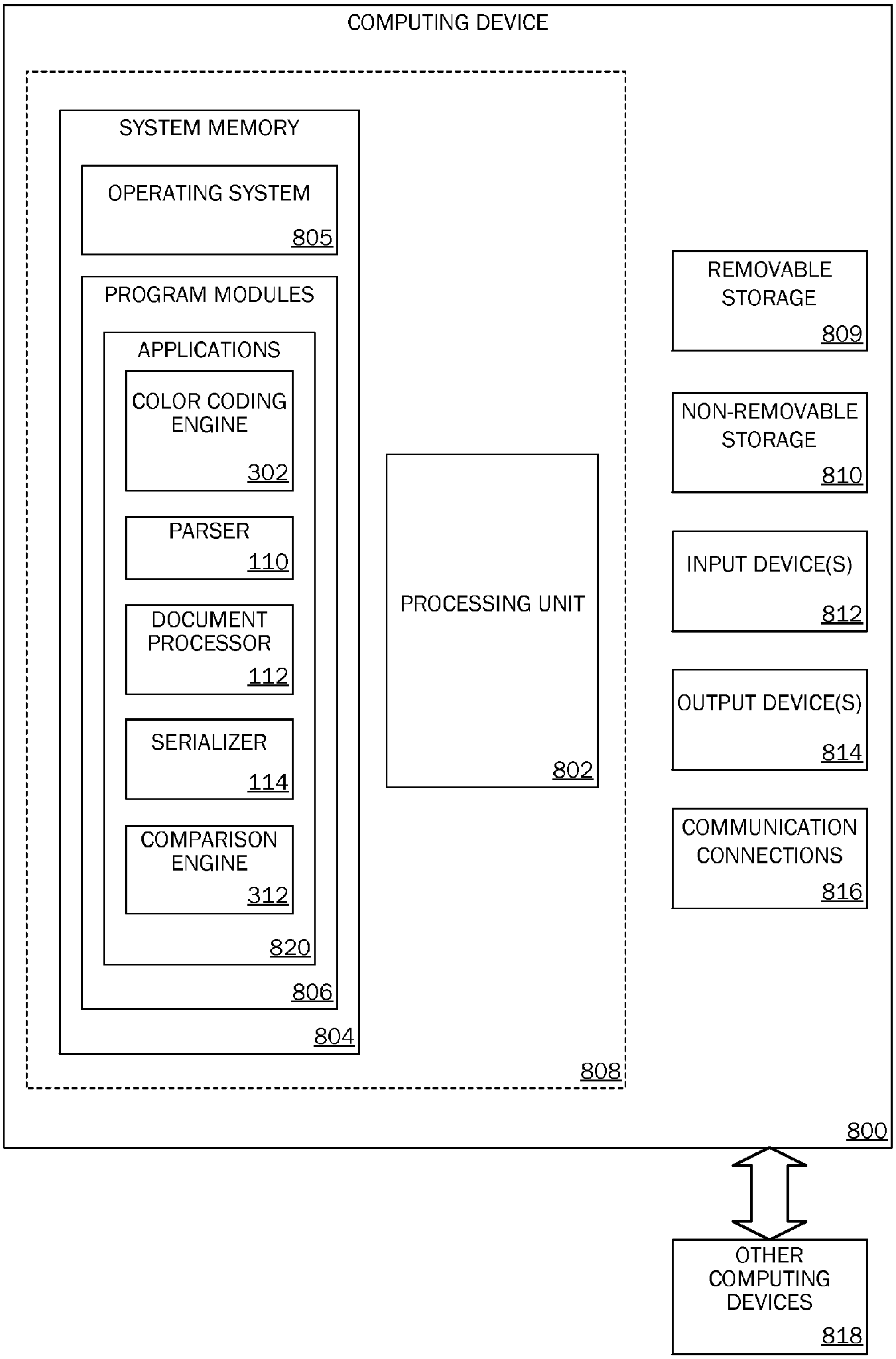
FIG. 8 is a block diagram illustrating example physical components of a computing device with which embodiments of the invention may be practiced.

The embodiments and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), handheld devices, multiprocessor systems, microprocessor-based or programmable consumer electronics, minicomputers, and mainframe computers. In addition, the embodiments and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like. FIGS. 8-10 and the associated descriptions provide a discussion of a variety of operating environments in which embodiments of the invention may be practiced. However, the devices and systems illustrated and discussed with respect to FIGS. 8-10 are for purposes of example and illustration and are not limiting of a vast number of computing device configurations that may be utilized for practicing embodiments of the invention, described herein.

FIG. 8 is a block diagram illustrating physical components (i.e., hardware) of a computing device 800 with which embodiments of the invention may be practiced. The computing device components described below may be suitable for the computing devices described above. In a basic configuration, the computing device 800 may include at least one processing unit 802 and a system memory 804. Depending on the configuration and type of computing device, the system memory 804 may comprise, but is not limited to, volatile storage (e.g., random access memory), non-volatile storage (e.g., read-only memory), flash memory, or any combination of such memories. The system memory 804 may include an operating system 805 and one or more program modules 806 suitable for running software applications 820 such as the color coding engine 302, the document processor 112, the parser 110, the document converter 102, the serializer 114, and the comparison engine 312. The operating system 805, for example, may be suitable for controlling the operation of the computing device 800. Furthermore, embodiments of the invention may be practiced in conjunction with a graphics library, other operating systems, or any other application program and is not limited to any particular application or system. This basic configuration is illustrated in FIG. 8 by those components within a dashed line 808. The computing device 800 may have additional features or functionality. For example, the computing device 800 may also include additional data storage devices (removable and/or non-removable) such as, for example, magnetic disks, optical disks, or tape. Such additional storage is illustrated in FIG. 8 by a removable storage device 809 and a non-removable storage device 820.

As stated above, a number of program modules and data files may be stored in the system memory 804. While executing on the processing unit 802, the program modules 806 (e.g., the color coding engine 302, the parser 110, the document processor 112, the serializer 114, and the comparison engine 312) may perform processes including, but not limited to, one or more of the stages of the roundtrip method 300 and/or the method 700 illustrated in FIG. 7. Other program modules that may be used in accordance with embodiments of the present invention may include electronic mail and contacts applications, word processing applications, spreadsheet applications, database applications, slide presentation applications, drawing or computer-aided application programs, etc.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. For example, embodiments of the invention may be practiced via a system-on-a-chip (SOC) where each or many of the components illustrated in FIG. 8 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the color coding engine 302, the parser 110, the document processor 112, the serializer 114, and the comparison engine 312 may be operated via application-specific logic integrated with other components of the computing device 800 on the single integrated circuit (chip). Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

The computing device 800 may also have one or more input device(s) 812 such as a keyboard, a mouse, a pen, a sound input device, a touch input device, etc. The output device(s) 814 such as a display, speakers, a printer, etc. may also be included. The aforementioned devices are examples and others may be used. The computing device 800 may include one or more communication connections 816 allowing communications with other computing devices 818. Examples of suitable communication connections 816 include, but are not limited to, RF transmitter, receiver, and/or transceiver circuitry; universal serial bus (USB), parallel, or serial ports, and other connections appropriate for use with the applicable computer readable media.

Embodiments of the invention, for example, may be implemented as a computer process (method), a computing system, or as an article of manufacture, such as a computer program product or computer readable media. The computer program product may be a computer storage media readable by a computer system and encoding a computer program of instructions for executing a computer process.

The term computer readable media as used herein may include computer storage media and communication media. Computer storage media may include volatile and nonvolatile, removable and non-removable media implemented in any method or technology for storage of information, such as computer readable instructions, data structures, program modules, or other data. The system memory 804, the removable storage device 809, and the non-removable storage device 820 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by the computing device 800. Any such computer storage media may be part of the computing device 800.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 9A:
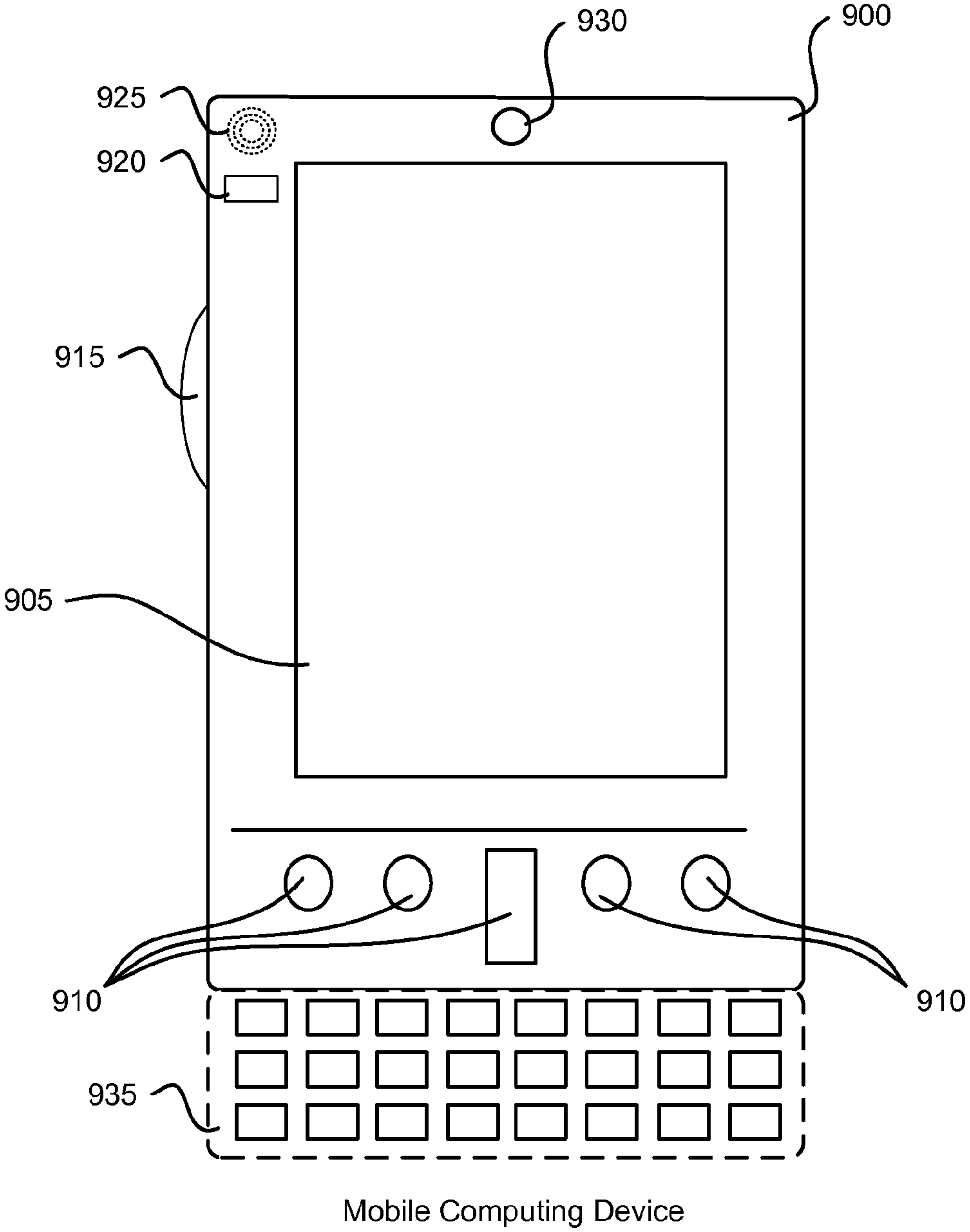
FIGS. 9A and 9B are simplified block diagrams of a mobile computing device with which embodiments of the present invention may be practiced.
Figure 9B:
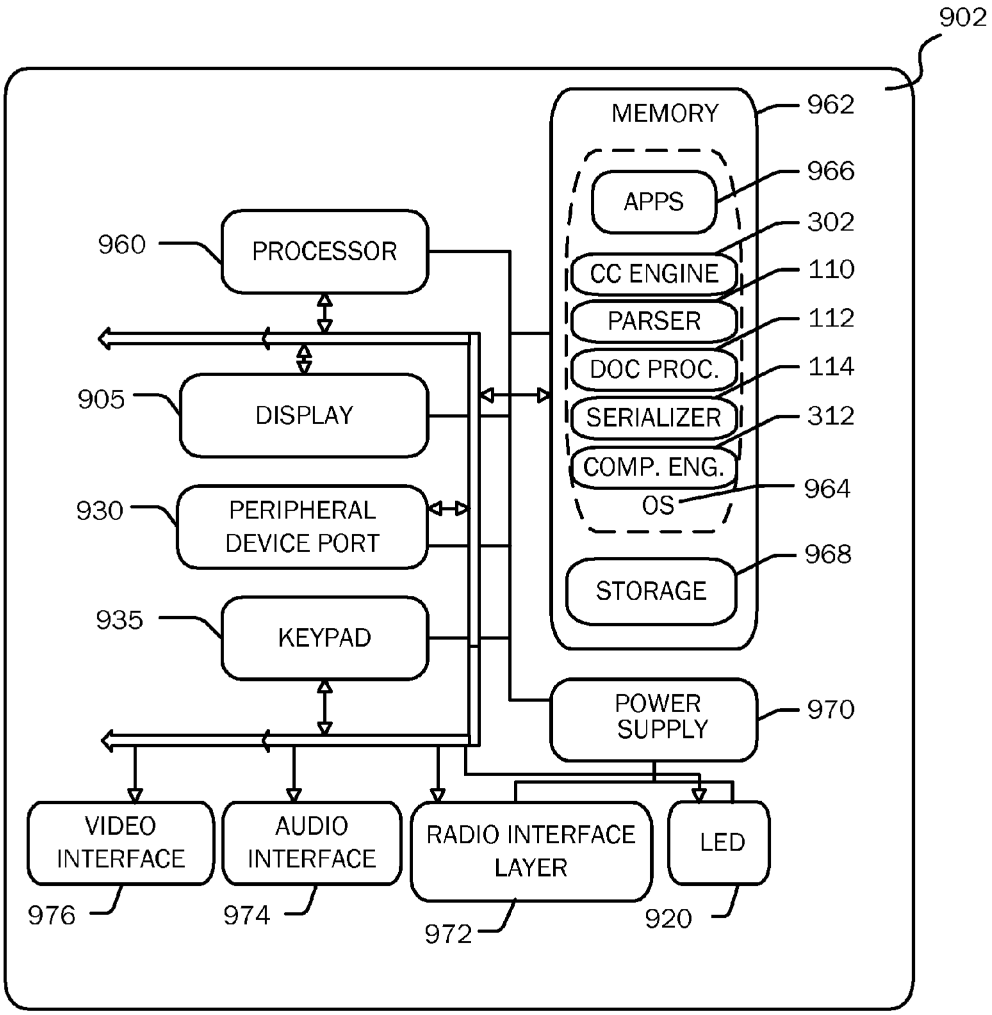
Figure 10:
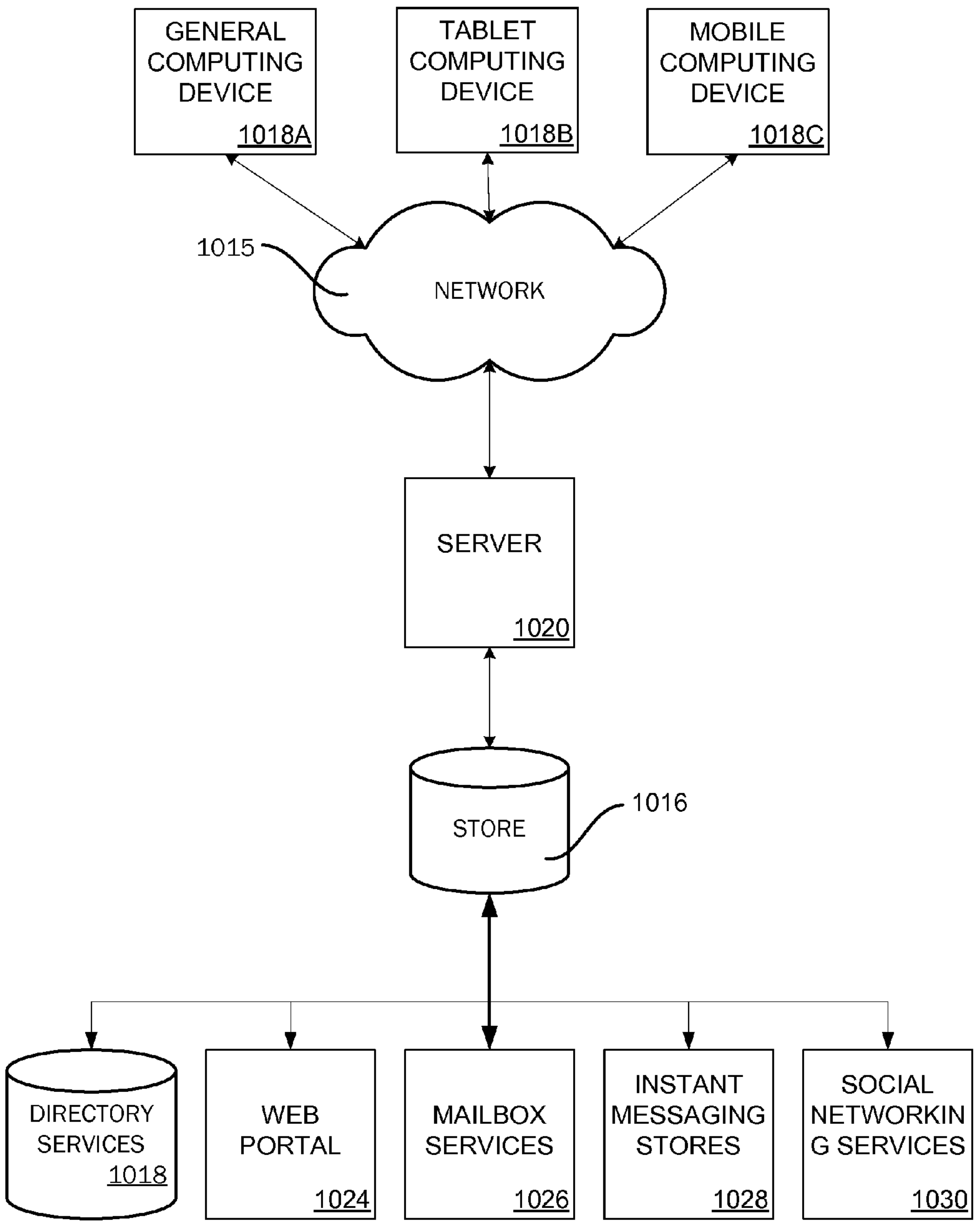
FIG. 10 is a simplified block diagram of a distributed computing system in which embodiments of the present invention may be practiced.

FIGS. 9A and 9B illustrate a mobile computing device 900, for example, a mobile telephone, a smart phone, a tablet personal computer, a laptop computer, and the like, with which embodiments of the invention may be practiced. With reference to FIG. 9A, one embodiment of a mobile computing device 900 for implementing the embodiments is illustrated. In a basic configuration, the mobile computing device 900 is a handheld computer having both input elements and output elements. The mobile computing device 900 typically includes a display 905 and one or more input buttons 910 that allow the user to enter information into the mobile computing device 900. The display 905 of the mobile computing device 900 may also function as an input device (e.g., a touch screen display). If included, an optional side input element 915 allows further user input. The side input element 915 may be a rotary switch, a button, or any other type of manual input element. In alternative embodiments, mobile computing device 900 may incorporate more or less input elements. For example, the display 905 may not be a touch screen in some embodiments. In yet another alternative embodiment, the mobile computing device 900 is a portable phone system, such as a cellular phone. The mobile computing device 900 may also include an optional keypad 935. Optional keypad 935 may be a physical keypad or a "soft" keypad generated on the touch screen display. In various embodiments, the output elements include the display 905 for showing a graphical user interface (GUI), a visual indicator 920 (e.g., a light emitting diode), and/or an audio transducer 925 (e.g., a speaker). In some embodiments, the mobile computing device 900 incorporates a vibration transducer for providing the user with tactile feedback. In yet another embodiment, the mobile computing device 900 incorporates input and/or output ports, such as an audio input (e.g., a microphone jack), an audio output (e.g., a headphone jack), and a video output (e.g., a HDMI port) for sending signals to or receiving signals from an external device.

FIG. 9B is a block diagram illustrating the architecture of one embodiment of a mobile computing device. That is, the mobile computing device 900 can incorporate a system (i.e., an architecture) 902 to implement some embodiments. In one embodiment, the system 902 is implemented as a "smart phone" capable of running one or more applications (e.g., browser, e-mail, calendaring, contact managers, messaging clients, games, and media clients/players). In some embodiments, the system 902 is integrated as a computing device, such as an integrated personal digital assistant (PDA) and wireless phone.

One or more application programs 966 may be loaded into the memory 962 and run on or in association with the operating system 964. Examples of the application programs include phone dialer programs, e-mail programs, personal information management (PIM) programs, word processing programs, spreadsheet programs, Internet browser programs, messaging programs, and so forth. The system 902 also includes a non-volatile storage area 968 within the memory 962. The non-volatile storage area 968 may be used to store persistent information that should not be lost if the system 902 is powered down. The application programs 966 may use and store information in the non-volatile storage area 968, such as e-mail or other messages used by an e-mail application, and the like. A synchronization application (not shown) also resides on the system 902 and is programmed to interact with a corresponding synchronization application resident on a host computer to keep the information stored in the non-volatile storage area 968 synchronized with corresponding information stored at the host computer. As should be appreciated, other applications may be loaded into the memory 962 and run on the mobile computing device 900, including the color coding engine 302, the parser 110, the document processor 112, the serializer 114, and the comparison engine 312 described herein.

The system 902 has a power supply 970, which may be implemented as one or more batteries. The power supply 970 might further include an external power source, such as an AC adapter or a powered docking cradle that supplements or recharges the batteries.

The system 902 may also include a radio 972 that performs the function of transmitting and receiving radio frequency communications. The radio 972 facilitates wireless connectivity between the system 902 and the "outside world," via a communications carrier or service provider. Transmissions to and from the radio 972 are conducted under control of the operating system 964. In other words, communications received by the radio 972 may be disseminated to the application programs 966 via the operating system 964, and vice versa.

The radio 972 allows the system 902 to communicate with other computing devices, such as over a network. The radio 972 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

This embodiment of the system 902 provides notifications using the visual indicator 920 that can be used to provide visual notifications and/or an audio interface 974 producing audible notifications via the audio transducer 925. In the illustrated embodiment, the visual indicator 920 is a light emitting diode (LED) and the audio transducer 925 is a speaker. These devices may be directly coupled to the power supply 970 so that when activated, they remain on for a duration dictated by the notification mechanism even though the processor 960 and other components might shut down for conserving battery power. The LED may be programmed to remain on indefinitely until the user takes action to indicate the powered-on status of the device. The audio interface 974 is used to provide audible signals to and receive audible signals from the user. For example, in addition to being coupled to the audio transducer 925, the audio interface 974 may also be coupled to a microphone to receive audible input, such as to facilitate a telephone conversation. In accordance with embodiments of the present invention, the microphone may also serve as an audio sensor to facilitate control of notifications, as will be described below. The system 902 may further include a video interface 976 that enables an operation of an on-board camera 930 to record still images, video stream, and the like.

A mobile computing device 900 implementing the system 902 may have additional features or functionality. For example, the mobile computing device 900 may also include additional data storage devices (removable and/or non-removable) such as, magnetic disks, optical disks, or tape. Such additional storage is illustrated in FIG. 9B by the non-volatile storage area 968. Computer storage media may include volatile and nonvolatile, removable and non-removable media implemented in any method or technology for storage of information, such as computer readable instructions, data structures, program modules, or other data.

Data/information generated or captured by the mobile computing device 900 and stored via the system 902 may be stored locally on the mobile computing device 900, as described above, or the data may be stored on any number of storage media that may be accessed by the device via the radio 972 or via a wired connection between the mobile computing device 900 and a separate computing device associated with the mobile computing device 900, for example, a server computer in a distributed computing network, such as the Internet. As should be appreciated such data/information may be accessed via the mobile computing device 900 via the radio 972 or via a distributed computing network. Similarly, such data/information may be readily transferred between computing devices for storage and use according to well-known data/information transfer and storage means, including electronic mail and collaborative data/information sharing systems.

FIG. 10 illustrates one embodiment of the architecture of a system for providing color coding of layout structure elements in a flow format document to one or more client devices, as described above. Content developed, interacted, edited, or tested in association with the color coding engine 302, the parser 110, the document processor 112, the serializer 114, and the comparison engine 312 may be stored in different communication channels or other storage types. For example, various documents may be stored using a directory service 1022, a web portal 1024, a mailbox service 1026, an instant messaging store 1028, or a social networking site 1030. The color coding engine 302, the parser 110, the document processor 112, the serializer 114, and the comparison engine 312 may use any of these types of systems or the like for enabling data utilization, as described herein. A server 1020 may provide the color coding engine 302, the parser 110, the document processor 112, the serializer 114, and the comparison engine 312 to clients. As one example, the server 1020 may be a web server providing the color coding engine 302, the parser 110, the document processor 112, the serializer 114, and the comparison engine 312 over the web. The server 1020 may provide the color coding engine 302, the parser 110, the document processor 112, the serializer 114, and the comparison engine 312 over the web to clients through a network 1015. By way of example, the client computing device 1018 may be implemented as the computing device 800 and embodied in a personal computer 1018*a*, a tablet computing device 1018*b* and/or a mobile computing device 1018*c* (e.g., a smart phone). Any of these embodiments of the client computing device 1018 may obtain content from the store 1016.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more embodiments provided in this application are not intended to limit or restrict the scope of the invention as claimed in any way. The embodiments, examples, and details provided in this application are considered sufficient to convey possession and enable others to make and use the best mode of claimed invention. The claimed invention should not be construed as being limited to any embodiment, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate embodiments falling within the spirit of the broader aspects of the general inventive concept embodied in this application that do not depart from the broader scope of the claimed invention.

We claim:

1. A method for assessing the accuracy of layout structure elements in a flow format document converted from a fixed format document, the method comprising:

receiving a target flow format document, wherein the target flow format document comprises a first flow document that has been analyzed by a color coding engine to detect logical layout object attributes in the first flow format document, the color coding engine having associated a color code to each logical layout attribute and embedded the color code within the first flow format document;

receiving an output flow format document that includes one or more logical layout objects each having one or more attributes;

comparing the color coded logical layout object attributes in the target flow format document with the one or more attributes in the output flow format document;

determining whether the color coded logical layout object attributes in the target flow format document are detected in the output flow format document, wherein the determination is representative of the accuracy of conversion of a fixed format document to the output flow format document; and calculating metrics based on the determination of whether the color coded logical layout object attributes in the target flow format document are detected in the output flow format document.

2. The method of claim 1, wherein the output flow format document is generated from a flow format document that has been converted from the target flow format document to a fixed format document and then converted from the fixed format document into the output flow format document.

3. The method of claim 2, wherein determining whether the color coded logical layout object attributes in the target flow format document are detected in the output flow format document provides a determination whether the color coded logical layout object attributes in the target flow format document have been preserved during conversion from the fixed format document to the output flow format document.

4. The method of claim 1, further comprising generating a report comprising the calculated metrics.

5. The method of claim 1, wherein calculating metrics includes calculating a precision metric.

6. The method of claim 1, wherein calculating metrics includes calculating a recall metric.

7. The method of claim 1, further comprising generating training data for a conversion engine.

8. The method of claim 1, wherein determining the accuracy of conversion comprises selecting one or more features to be compared.

9. The method of claim 8, wherein the one or more features to be compared is selected from the group consisting of sections, paragraphs, lists, tables, and words.

10. A system for assessing the accuracy of layout structure elements in a flow format document converted from a fixed format document, the method comprising:

one or more processors; and a memory coupled to the one or more processors, the one or more processors operable to:

receive a target flow format document, wherein the target flow format document comprises a first flow document that has been analyzed by a color coding engine to detect logical layout object attributes in the first flow format document, the color coding engine having associated a color code to each logical layout attribute and embedded the color code within the first flow format document;

receive an output flow format document including one or more logical layout objects each having one or more attributes;

compare the color coded logical layout object attributes in the target flow format document with the one or more attributes in the output flow format document; and determine whether the color coded logical layout object attributes in the target flow format document are detected in the output flow format document, wherein the determination is representative of the accuracy of conversion of a fixed format document to the output flow format document; and calculate metrics based on the determination of whether the color coded logical layout object attributes in the target flow format document are detected in the output flow format document, the metrics providing a measure of conversion accuracy.

11. The system of claim 10, wherein the output flow format document is generated from a flow format document that has been converted from the target flow format document to a fixed format document and then converted from the fixed format document into the output flow format document.

12. The system of claim 10, wherein the metrics include a precision metric.

13. The system of claim 10, wherein the metrics include a recall metric.

14. The system of claim 10, wherein the processor is further operable to generate training data for a conversion engine.

15. The system of claim 10, wherein determining the accuracy of conversion comprises selecting one or more features to be compared.

16. The system of claim 15, wherein the one or more features to be compared is selected from the group consisting of sections, paragraphs, lists, tables, and words.

17. The system of claim 10, wherein the one or more processors is operable to generate a report comprising the calculated metrics.

18. A method for testing conversion accuracy of a fixed-format-to-flow-format document conversion engine, the method comprising:

detecting one or more attributes of one or more logical layout objects in a first flow format document;

embedding in the first flow format document one or more colors, wherein each of the one or more colors is associated with a specific one of the detected attributes;

converting the first flow format document to a fixed format document;

converting the fixed format document into a second flow format document using the fixed-format-to-flow-format document conversion engine;

detecting logical layout object attributes and their associated colors in the second flow format document;

comparing the associated colors in the first flow format document with the associated colors in the second flow format document;

determining, based on the comparison, whether the associated colors in the first flow format document are detected in the second flow format document, wherein the determination is representative of the accuracy of the fixed-format-to-flow-format document conversion engine; and calculating metrics based on the determination of whether the color coded logical layout object attributes in the target flow format document are detected in the output flow format document.

* * * * *